United States Patent
Yamaguchi

(10) Patent No.: US 10,140,142 B2
(45) Date of Patent: *Nov. 27, 2018

(54) GROUPING AND PLACEMENT OF VIRTUAL MACHINES BASED ON SIMILARITY AND CORRELATION OF FUNCTIONAL RELATIONS

(71) Applicant: NEC Corporation, Tokyo (JP)

(72) Inventor: Keisuke Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/094,012

(22) Filed: Apr. 8, 2016

(65) Prior Publication Data

US 2016/0224366 A1    Aug. 4, 2016

Related U.S. Application Data

(63) Continuation of application No. 14/112,923, filed as application No. PCT/JP2012/061001 on Apr. 18, 2012, now Pat. No. 9,710,295.

(30) Foreign Application Priority Data

Apr. 20, 2011  (JP) ................................. 2011-094119

(51) Int. Cl.
  *G06F 9/50*   (2006.01)
  *G06F 9/455*   (2018.01)
  *G06F 11/14*   (2006.01)

(52) U.S. Cl.
  CPC ...... *G06F 9/45558* (2013.01); *G06F 9/45533* (2013.01); *G06F 9/5077* (2013.01);
  (Continued)

(58) Field of Classification Search
  CPC ............ G06F 9/45558; G06F 9/45533; G06F 9/5077; G06F 2009/4557; G06F 11/1484;
  (Continued)

(56) References Cited

U.S. PATENT DOCUMENTS 7,944,913 B2    5/2011    Ogasahara
7,975,186 B2    7/2011    Kato
(Continued)

FOREIGN PATENT DOCUMENTS

CN        1929435 A      3/2007
CN      101330370 A    12/2008
(Continued)

OTHER PUBLICATIONS

U.S. Notice of Allowance dated Jan. 4, 2016 in co-pending U.S. Appl. No. 14/112,923.
(Continued)

*Primary Examiner* — Benjamin C Wu
(74) *Attorney, Agent, or Firm* — McGinn I.P. Law, Group, PLLC.

(57) ABSTRACT

A virtual machine managing apparatus includes a processor coupled to a memory storing instructions for executing an acquiring unit configured to acquire performance values of plural virtual machines, and a control unit configured to control virtual machines having approximately a same sequential change of the performance values in a time-domain, out of the plural virtual machines, to be arranged on different processing apparatuses among plural processing apparatuses carrying out processes of virtual machines.

17 Claims, 12 Drawing Sheets

(52) U.S. Cl.
CPC .. *G06F 11/1484* (2013.01); *G06F 2009/4557* (2013.01); *Y02D 10/22* (2018.01); *Y02D 10/26* (2018.01); *Y02D 10/28* (2018.01); *Y02D 10/36* (2018.01)

(58) Field of Classification Search
CPC .... Y02B 60/146; Y02B 60/142; Y02B 60/167
See application file for complete search history.

(56) References Cited

U.S. PATENT DOCUMENTS

| | | |
|---|---|---|
| 8,261,268 B1 | 9/2012 | Forgette |
| 8,286,035 B2 | 10/2012 | Kato |
| 8,402,140 B2 | 3/2013 | Zhang et al. |
| 2007/0140277 A1 | 6/2007 | Chen et al. |
| 2007/0271560 A1 | 11/2007 | Wahlert et al. |
| 2009/0210527 A1 | 8/2009 | Kawato |
| 2009/0217099 A1 | 8/2009 | Kato |
| 2010/0107159 A1 | 4/2010 | Radhakrishnan |
| 2010/0250744 A1 | 9/2010 | Hada |
| 2010/0262964 A1 | 10/2010 | Uyeda |
| 2010/0293409 A1 | 11/2010 | Machida |
| 2010/0313200 A1 | 12/2010 | Rozee et al. |
| 2011/0035494 A1 | 2/2011 | Pandey |
| 2011/0214122 A1 | 9/2011 | Lublin |
| 2011/0214123 A1 | 9/2011 | Lublin |
| 2012/0030349 A1 | 2/2012 | Sugai |
| 2012/0192014 A1 | 7/2012 | Kato |
| 2012/0266166 A1 | 10/2012 | Farkas |

FOREIGN PATENT DOCUMENTS

| | | |
|---|---|---|
| EP | 2 037 362 A1 | 3/2009 |
| JP | 2009-199395 A | 9/2009 |
| JP | 2009-199533 A | 9/2009 |
| JP | 2010-117760 A | 5/2010 |
| JP | 2010-211546 A | 9/2010 |
| JP | 2010-244181 A | 10/2010 |

OTHER PUBLICATIONS

U.S. Office Action dated Aug. 26, 2015 in co-pending U.S. Appl. No. 14/112,923.
International Search Report (ISR) (PCT Form PCT/ISA/210), in PCT/JP2012/061001, dated Aug. 7, 2012.
Chinese Office Action dated Mar. 21, 2016 with an English translation.
United States Office Action dated Oct. 18, 2016 in U.S. Appl. No. 14/112,923.
United States Notice of Allowance dated Mar. 28, 2017 in U.S. Appl. No. 14/112,923.
Extended European Search Report dated Mar. 23, 2016.

Fig.5

| TIME | WEB1.CPU | WEB1.MEM | WEB1.DSK | WEB2.CPU | ... |
|---|---|---|---|---|---|
| 2011/3/1 10:00 | 15 | 79 | 50 | 32 | ... |
| 2011/3/1 10:05 | 18 | 51 | 25 | 32 | ... |
| 2011/3/1 10:10 | 22 | 51 | 25 | 35 | ... |
| 2011/3/1 10:15 | 20 | 81 | 50 | 50 | ... |
| .. | .. | .. | .. | .. | .. |

121

| | | |
|---|---|---|
| 125 | | |
| DISTRIBUTED-ARRANGEMENT RESTRICTION | CONDITION 1 | WEB1, WEB2 |
| | CONDITION 2 | AP1, AP2 |
| | CONDITION 3 | DB1, DB2 |
| | CONDITION 4 | WEB3, WEB4 |
| COLLECTIVE-ARRANGEMENT RESTRICTION | CONDITION 5-1 | WEB1, AP1, DB1 |
| | CONDITION 5-2 | WEB2, AP2, DB2 |
| | CONDITION 6-1 | WEB4, AP3, DB3 |
| | CONDITION 6-2 | WEB3 |

GROUPING AND PLACEMENT OF VIRTUAL MACHINES BASED ON SIMILARITY AND CORRELATION OF FUNCTIONAL RELATIONS

The present application is a Continuation Application of U.S. patent application Ser. No. 14/112,923, filed on Oct. 19, 2013, which is based on International Application No. PCT/JP2012/061001, filed on Apr. 18, 2012, which is based on Japanese Patent Application No. 2011-094119, filed on Apr. 20, 2011, the entire contents of which are incorporated herein by reference.

TECHNICAL FIELD

The present invention relates to a virtual machine managing apparatus, a virtual machine managing method, and a program thereof, and particularly relates to a virtual machine managing apparatus, a virtual machine managing method, and a program thereof which manage arrangement of a virtual machine.

BACKGROUND ART

As a method to use resources of an information processing system effectively, a method to arrange a plurality of virtual machines according to a load or the like of a physical processing apparatus (virtual machine server), which is included in the information processing system, is known. In the above-mentioned information processing system (virtual machine system) using virtual machines, an arrangement restriction which is corresponding to a condition for arranging each virtual machine is generated by an administrator according to a predetermined policy, on the basis of contents of processes carried out by each virtual machine, and then the virtual machine is arranged on each processing apparatus according to the arrangement restriction.

However, a large scale virtual machine system such as a data center or the like, on which a large number of the virtual machines of a customer system work, has a problem that an administrator can not grasp the contents of processes which are carried out by each virtual machine, and consequently can not generate the appropriate arrangement restriction.

One example of the art to solve the problem is disclosed in patent literature 1. A virtual machine managing apparatus disclosed in the patent literature 1 extracts virtual machines having a correlation relation on the basis of load information of each virtual machine, and arranges the extracted virtual machines on the same virtual machine server to reduce power consumption of virtual machine servers.

Here, as a related art, patent literature 2 discloses an operation managing system which generates a correlation model of a system on the basis of measured values of performance values of plural types in the system, and detects correlation destruction for the performance values inputted newly, by use of the generated correlation model, and specifies a cause of a fault of the system.

As another related art, patent literature 3 discloses a method to estimate the maximum load of each virtual machine on the basis of load information of each virtual machine, and to determine the virtual machines which should be arranged on virtual machine servers respectively, on the basis of the estimated maximum load.

CITATION LIST

Patent Literature

[Patent Literature 1] Japanese Patent Application Laid-Open No. 2010-211546

[Patent Literature 2] Japanese Patent Application Laid-Open No. 2009-199533

[Patent Literature 3] Japanese Patent Application Laid-Open No. 2010-244181

SUMMARY OF INVENTION

Technical Problem

According to the above-mentioned patent literature 1, the virtual machine managing apparatus arranges the virtual machines having the correlation relation on the same virtual machine server. As a result, even if a plurality of virtual machines carry out the distributed processing for the same service, the plural virtual machines are arranged on the same virtual machine server. For this reason, there is a problem that, in the case that the virtual machine server enters into a state of fault, the service for which the distributed processing is carried out is suspended, and consequently a customer's transaction cannot be continued any more.

An object of the present invention is to provide a virtual machine managing apparatus, a virtual machine managing method, and a program thereof which are able to solve the above-mentioned problem.

Solution to Problem

A virtual machine managing apparatus according to an exemplary aspect of the invention includes: a similar group generating means for generating a group of virtual machines having a similarity relation which indicates that performance values of virtual machines at each timing are approximately the same, out of plural virtual machines; and an arrangement restriction generating means for outputting the group of virtual machines having the similarity relation as a first arrangement restriction indicating a group of virtual machines to be arranged on different processing means among plural processing means carrying out processes of virtual machines.

A virtual machine managing method according to an exemplary aspect of the invention includes: generating a group of virtual machines having a similarity relation which indicates that performance values of virtual machines at each timing are approximately the same, out of plural virtual machines; and outputting the group of the virtual machines having the similarity relation as a first arrangement restriction indicating a group of virtual machines to be arranged on different processing means among plural processing means carrying out processes of virtual machines.

A computer readable storage medium according to an exemplary aspect of the invention, records thereon a program, causing a computer to perform a method including: generating a group of virtual machines having a similarity relation which indicates that performance values of virtual machines at each timing are approximately the same, out of plural virtual machines; and outputting the group of virtual machines having the similarity relation as a first arrangement restriction indicating a group of virtual machines to be arranged on different processing means among plural processing means carrying out processes of virtual machines.

Advantageous Effect of Invention

An effect of the present invention is that it is possible to perform an arrangement of virtual machines, which has fault tolerance, in the virtual machine system.

BRIEF DESCRIPTION OF DRAWINGS

FIG. 5 is a diagram showing an example of performance sequence information 121, according to the first exemplary embodiment of the present invention.

DESCRIPTION OF EMBODIMENTS (First Exemplary Embodiment)

Next, a first exemplary embodiment of the present invention will be described.

Figure 2:
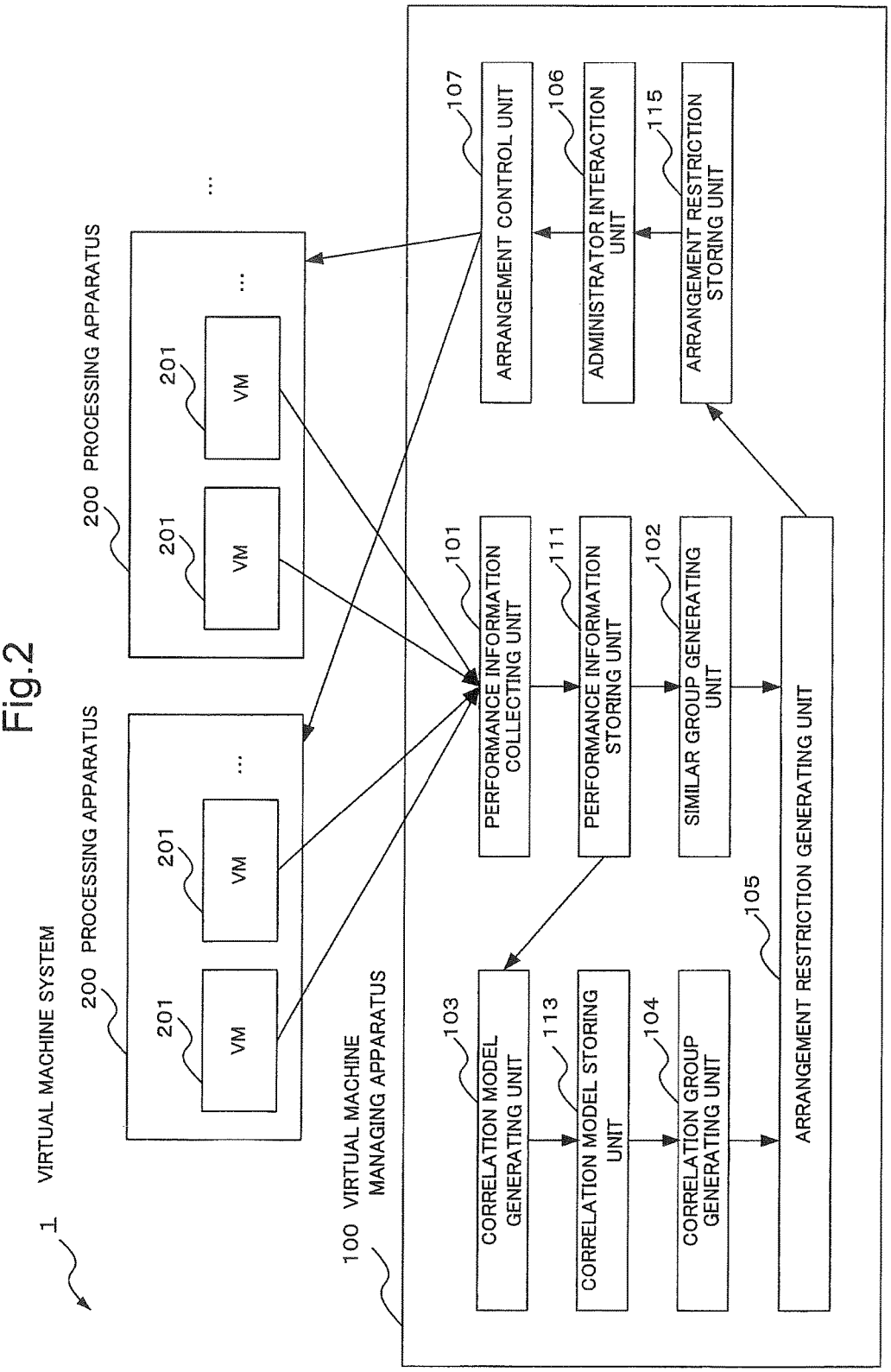
FIG. 2 is a block diagram showing a configuration of a virtual machine system 1, according to the first exemplary embodiment of the present invention.

First, a configuration according to the first exemplary embodiment of the present invention will be described. FIG. 2 is a block diagram showing a configuration of a virtual machine system 1, according to the first exemplary embodiment of the present invention.

Referring to FIG. 2, the virtual machine system 1 according to the first exemplary embodiment of the present invention includes a virtual machine managing apparatus 100 and a plurality of processing apparatuses 200.

The virtual machine managing apparatus 100 generates an arrangement restriction which is corresponding to a condition for arranging a virtual machine 201 (VM (Virtual Machine)) on the processing apparatus 200, on the basis of performance information of each virtual machine 201, and arranges each virtual machine 201 on each processing apparatus 200 according to the arrangement restriction.

The processing apparatus 200 is a physical computer which carries out a process of the arranged virtual machine 201. The virtual machine 201 is a virtual computer which is set up by use of resources of the processing apparatus 200. Each virtual machine 201 carries out processes of, for example, a Web server, an application (AP) server, a database (DB) server or the like. Moreover, a system, which carries out a customer's transaction or the like, includes the virtual machines 201 which carry out the processes of these servers.

Figure 3:
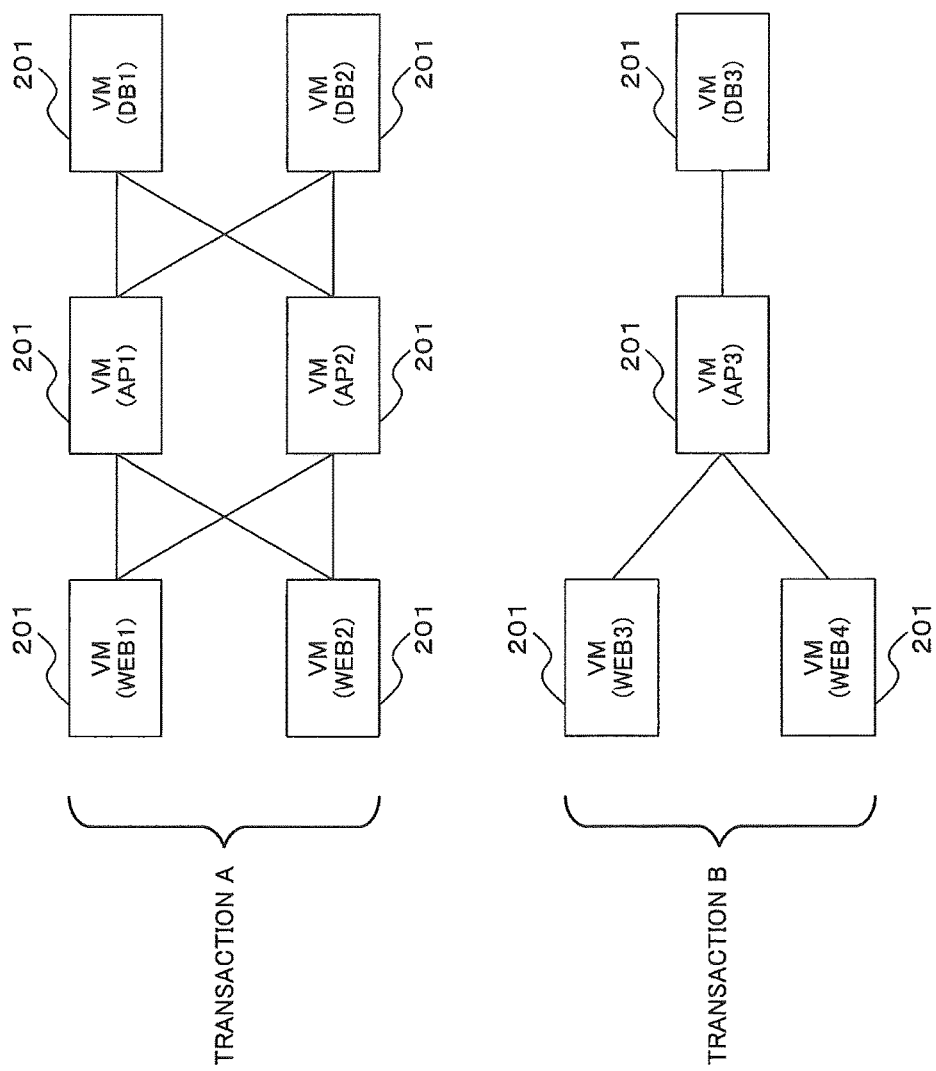
FIG. 3 is a diagram showing an example of a system including virtual machines 201, according to the first exemplary embodiment of the present invention

FIG. 3 is a diagram showing an example of a system including virtual machines 201, according to the first exemplary embodiment of the present invention. The example in FIG. 3 shows two systems of a transaction A and a transaction B each of which includes three-tier model of WEB, AP and DB.

With respect to the transaction A, the virtual machines 201 having identifiers WEB 1, WEB 2, which are the WEB servers, form a load distribution configuration. Similarly, the virtual machines 201 having identifiers AP1, AP2, which are the AP servers, form a load distribution configuration, and the virtual machines 201 having identifiers DB1, DB2, which are the DB servers, form a load distribution configuration.

With respect to the transaction B, the virtual machines 201 having identifiers WEB3, WEB4, which are the Web servers, form a load distribution configuration. The virtual machine 201 having identifier AP3, which is the AP server, forms an alone configuration, and the virtual machine 201 having identifier DB3, which is the DB server, forms an alone configuration.

The virtual machine managing apparatus 100 includes a performance information collecting unit 101, a similar group generating unit 102, a correlation model generating unit 103, a correlation group generating unit 104, an arrangement restriction generating unit 105, an administrator interaction unit 106, an arrangement control unit 107, a performance information storing unit 111, a correlation model storing unit 113, and an arrangement restriction storing unit 115.

Here, from each virtual machine 201 which is a target to be rearranged on each processing apparatus 200, at a predetermined time interval, the performance information collecting unit 101 acquires measured data (measured value) of performance values of plural items, which are measured in each virtual machine 201. As the item of the performance value, for example, a rate of using CPU (Central Processing Unit) which is denoted as CPU, an amount of used memory which is denoted as MEM, and an amount of used DSK which is denoted as DSK are acquired.

Moreover, a set of the virtual machine 201 and the item of the performance value is defined as a type of the performance value (referred to as a performance type, or abbreviated merely as a type), and a set of the performance values of the plural types measured at the same time is defined as performance information.

The performance information collecting unit 101 stores a time-domain sequential change of the performance information in the performance information storing unit 111 as performance sequence information 121.

FIG. 5 is a diagram showing an example of the performance sequence information 121, according to the first exemplary embodiment of the present invention. According to the example shown in FIG. 5, the performance sequence information 121 includes a rate of using CPU (WEB1.CPU), an amount of used memory (WEB1.MEM), an amount of used disk (WEB1.DSK) of the virtual machine 201 having identifier WEB1, and a rate of using CPU of the virtual machine 201 (WEB2.CPU) having identifier WEB2, or the like as the performance type.

The similar group generating unit 102 generates a group of virtual machines 201, which have a similarity relation each other, out of the plural virtual machines 201 which are the target to be rearranged.

Here; with respect to each set of two virtual machines 201 (a pair of virtual machines 201) among the virtual machines 201 which are the target to be rearranged, the similar group generating unit 102 detects whether the performance values of the same item change sequentially in the time-domain with having approximately the same values, that is, whether the performance values of the same item at each timing are approximately the same. In the case that the performance values of the same item change sequentially in the time-domain with having approximately the same values, the similar group generating unit 102 judges that the similarity relation exists between the performance values of the item.

Here, the similar group generating unit 102 may compare the performance values of the same item which are observed at each time, and judge that, in the case that a mean value or an integral value of an absolute value of difference between the performance values observed during a predetermined period of time is equal to or smaller than a predetermined value, the similarity relation exists between the performance values of the item.

With respect to each pair of the virtual machines 201 among the virtual machines 201 which are the target to be rearranged, the similar group generating unit 102 judges that the similarity relation exists between the pair of the virtual machines 201 in the case that the number of items having the similarity relation is equal to or greater than a predetermined value.

Note that, the similar group generating unit 102 may judge that the pair of the virtual machines 201 has the similarity relation by use of another method, for example, by judging whether the similarity relation exists between the performance values of a predetermined item or not, instead of by use of the number of items having the similarity relation.

Then, the similar group generating unit 102 defines a group, which includes plural virtual machines 201 associated by the pair of the virtual machines 201 having the similarity relation, as a group of virtual machines 201 having the similarity relation.

Here, in the case that a pair of virtual machines A and B has the similarity relation, the similar group generating unit 102 defines a group of the virtual machines A and B as a group of virtual machines 201 having the similarity relation. Moreover, in the case that a pair of virtual machines A and B has the similarity relation and furthermore a pair of virtual machines B and C has the similarity relation, the similar group generating unit 102 defines a group including the virtual machines A, B and C as a group of the virtual machines 201 having the similarity relation. In this case, with no relation to a judgment whether a pair of virtual machines A and C has the similarity relation, the similar group generating unit 102 may define the group including virtual machines A, B and C as a group of virtual machines 201 having the similarity relation.

Note that, in the case that, in addition to the pair of the virtual machines A and B and the pair of the virtual machines B and C, the pair of the virtual machines A and C has the similarity relation, the similar group generating unit 102 may define the group including virtual machines A, B and C as a group of virtual machines 201 having the similarity relation.

Figure 6:
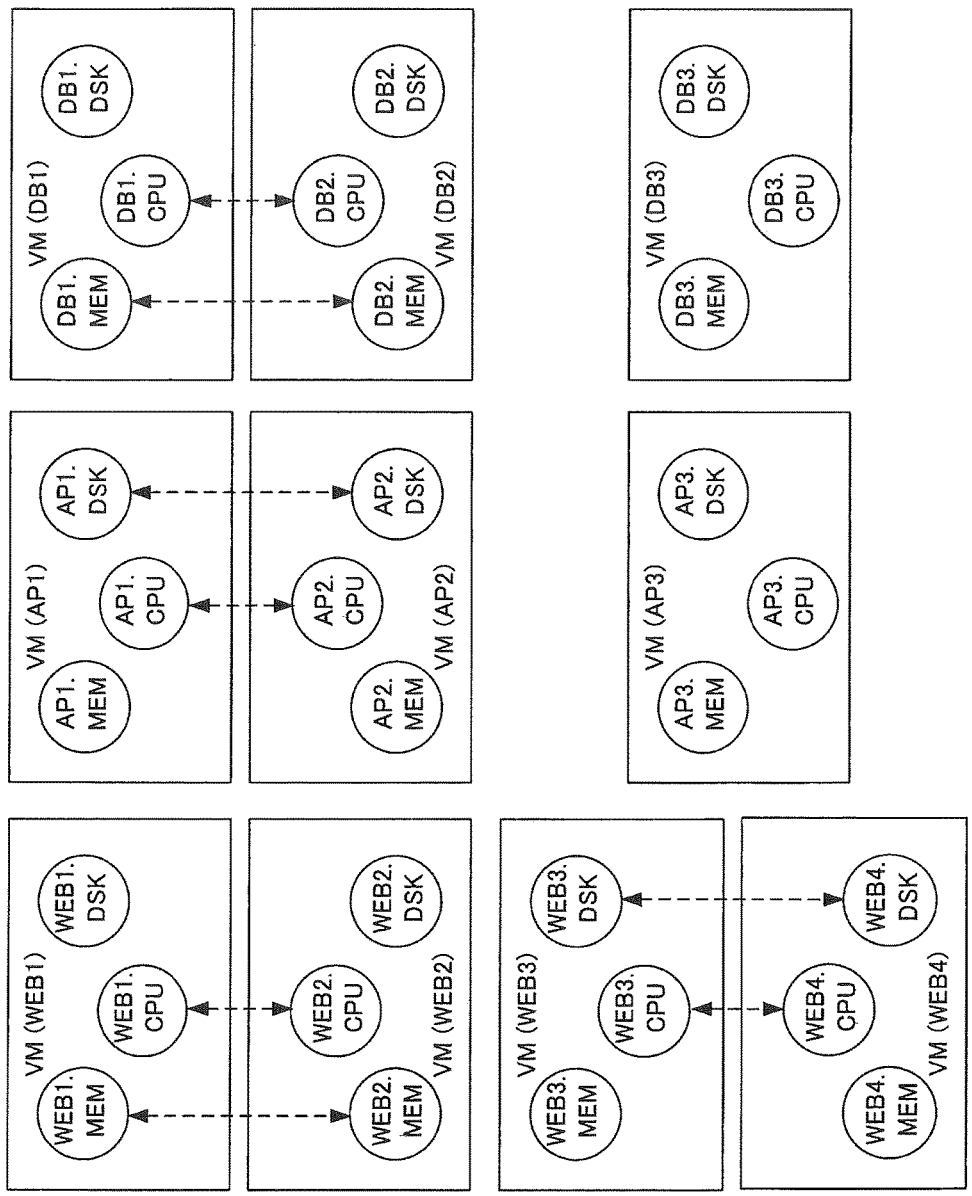
FIG. 6 is a diagram showing an example of a result of detecting a similarity relation between performance values, according to the first exemplary embodiment of the present invention.

FIG. 6 is a diagram showing an example of a result of detecting the similarity relation between performance values, according to the first embodiment of the present invention. In FIG. 6, each node indicates the performance type, and a dotted arrow between the nodes indicates the similarity relation between the performance values.

According to the example shown in FIG. 6, with respect to a pair of the virtual machines having identifiers WEB 1, WEB2, the similarity relation is detected in a rate of using CPU, and an amount of used memory. Here, in the case that it is judged that the similarity relation exists between a pair of the virtual machines when the number of items having the similarity relation is equal to or greater than 2, the similar group generating unit 102 judges that the similarity relation exists in the pair of the virtual machines 201 having identifiers WEB1, WEB2. Similarly, the similar group generating unit 102 judges that the similarity relation exists in pairs of the virtual machines having identifiers AP1, AP2, and DB1, DB2, respectively. Then, the similar group generating unit 102 defines each of a group of the virtual machines 201 having identifiers WEB 1, WEB2, a group of the virtual machines 201 having identifiers AP1, AP2, and a group of the virtual machines 201 having identifiers DB1, DB2, as a group of the virtual machines 201 having the similarity relation.

The correlation model generating unit 103 generates a correlation model 123 for the plural virtual machines 201 which are the target to be rearranged, on the basis of the performance sequence information 121. Here, the correlation model generating unit 103 determines a correlation function (transformation function) which indicates a correlation relation between performance values of two different performance types out of plural performance types, per two different performance types, on the basis of the performance information which is included in the performance sequence information 121 and which is acquired in a predetermined period of time, and generates the correlation model 123 which is a set of the determined correlation functions. The correlation function is a function to estimate, on the basis of a time-domain sequence of a performance value of one performance type, a time-domain sequence of a measured value of the other performance type, and the correlation function is determined by carrying out the system identification process to the above-mentioned time-domain sequences of measured values of two different performance types, as shown in the patent literature 2. Furthermore, the correlation model generating unit 103 may calculate, on the basis of a transformation error of the correlation function, a weight coefficient which becomes small according to an average value of transformation errors, for example, per the correlation function. Then, the correlation model generating unit 103 may use a set of the correlation functions whose weight coefficient is equal to or greater than a predetermine value as the correlation model 123.

The correlation model storing unit 113 stores the correlation model 123 generated by the correlation model generating unit 103.

Figure 7:
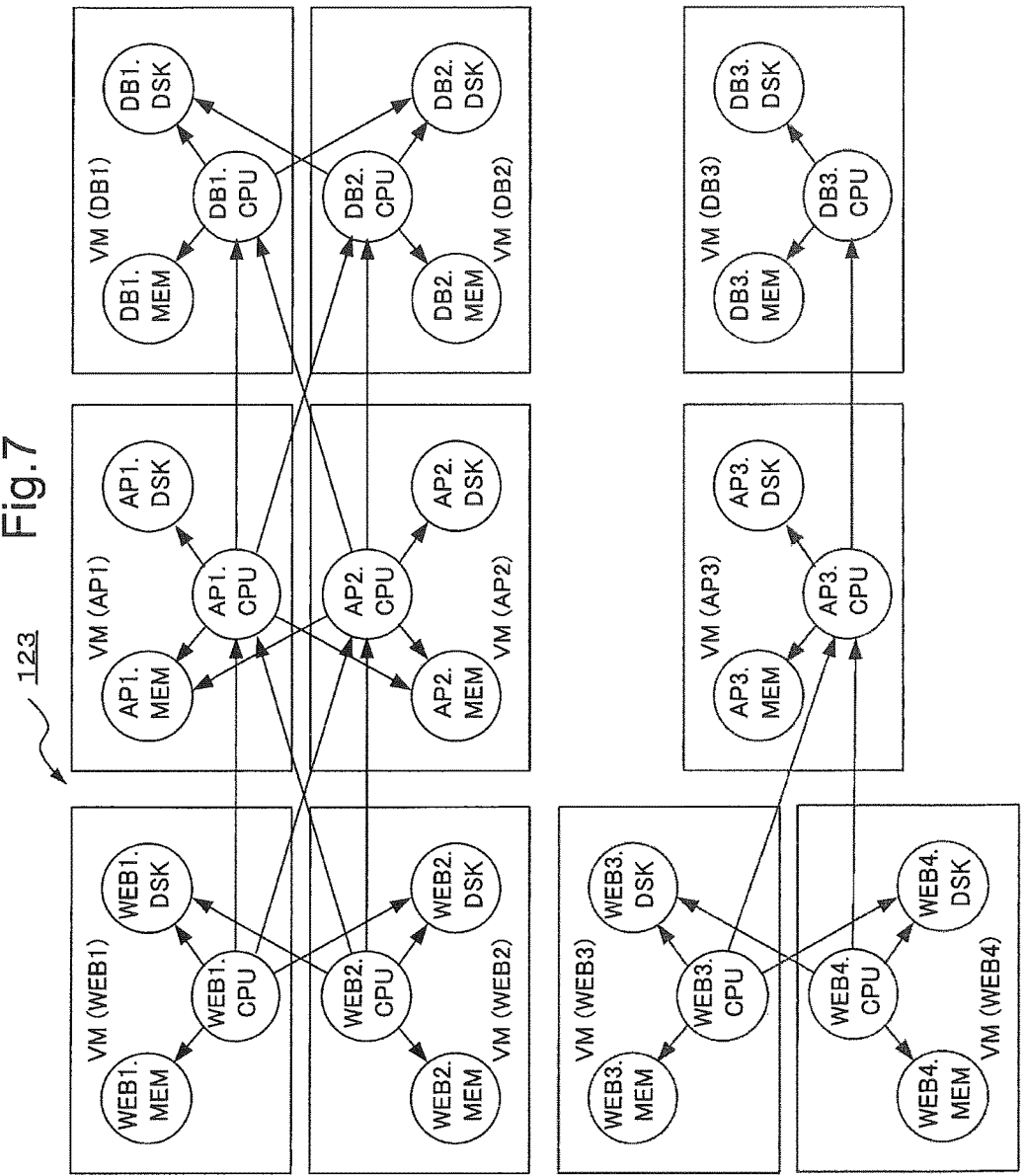
FIG. 7 is a diagram showing an example of a correlation model 123, according to the first exemplary embodiment of the present invention.

FIG. 7 is a diagram showing an example of a correlation model 123, according to the first exemplary embodiment of the present invention. In FIG. 7, each node expressed by a round mark indicates a performance type, and a solid line arrow between the nodes indicates a correlation relation between two performance values which is determined by the correlation model generating unit 103. The correlation function (not shown) is determined per the correlation relation.

Note that, as mentioned above, the similarity relation between the performance values is detected in the case that performance values of the same item change sequentially in the time-domain with having approximately the same values. Meanwhile, the correlation relation between the performance values is detected, for example, in the case that performance values of the different items change sequentially in the time-domain with having different values which are proportional each other, or in the case that performance values of the different items change sequentially in the time-domain with having values whose direction of change in the time-domain are reversed each other, or in the case that performance values of the different items change sequentially in the time-domain with having values which are shifted each other in the time-domain.

On the basis of the correlation model 123 of the correlation model storing unit 113, the correlation group generating unit 104 generates a group of virtual machines 201 which have the similarity relation, out of the plural virtual machines 201 which are the target to be rearranged.

In the case that the number of the correlation relations between a performance value of each item of one virtual machine 201 and the a performance value of each item of the other virtual machine 201 of a pair of virtual machines 210, among plural virtual machines 201 which are the target to be rearranged, is equal to or greater than a predetermined value, the correlation group generating unit 104 judges that the correlation relation exists in the pair of the virtual machines 201.

Note that, the correlation group generating unit 104 may judge that the pair of the virtual machines 201 has the correlation relation by use of another method, for example, by judging whether the correlation relation exists between a performance value of a predetermined item of one virtual machine 201 and a performance value of a predetermined item of the other virtual machine 201 of the pair, instead of by use of the number of the correlation relations between the performance values.

Then, the correlation group generating unit 104 defines a group, which includes a plurality of the virtual machines 201 associated by the pair of virtual machines 201 having the correlation relation, as a group of virtual machines having the correlation relation.

Here, in the case that a pair of virtual machines A and B has the correlation relation, the correlation group generating unit 104 defines a group of the virtual machines A and B as a group of the virtual machines 201 having the correlation relation. Moreover, in the case that a pair of virtual machines A and B has the correlation relation and a pair of virtual machines B and C has the correlation relation, the correlation group generating unit 104 defines a group including the virtual machines A, B and C as a group of the virtual machines 201 having the correlation relation. In this case, with no relation to a judgment whether a pair of virtual machines A and C has the correlation relation, the correlation group generating unit 104 may define the group including virtual machines A, B and C as a group of virtual machines 201 having the correlation relation.

Note that, in the case that, in addition to the pair of the virtual machines A and B, and the pair of the virtual machines B and C, the pair of the virtual machines A and C has the correlation relation, the correlation group generating unit 104 may define the group including virtual machines A, B and C as a group of virtual machines 201 having the correlation relation.

For example, according to the correlation model 123 shown in FIG. 7, with respect to a pair of the virtual machines 201 having identifiers WEB1, WEB2, the correlation relation is detected between a rate of using CPU of the virtual machine 201 having identifier WEB 1 and a rate of using disk of the virtual machine 201 having identifier WEB2, and between a rate of using CPU of the virtual machine 201 having identifier WEB2 and a rate of using disk of the virtual machine 201 having identifier WEB 1. Here, in the case that it is judged that the correlation relation exists in a pair of virtual machines 201 when the number of the correlation relations is equal to or greater than 1, the correlation group generating unit 104 judges that the correlation relation exists in the pair of the virtual machines 201 having identifiers WEB 1, WEB2. Similarly, the correlation group generating unit 104 judges that the correlation relation exists in pairs of the virtual machines 201 having identifiers AP1 and AP2, DB1 and DB2, WEB1 and AP1, WEB1 and AP2, WEB2 and AP1, WEB2 and AP2, AP1 and DB1, AP1 and DB2, AP2 and DB1, AP2 and DB2, respectively. Then, the correlation group generating unit 104 defines a group including the virtual machines 201 having identifiers WEB1, WEB2, AP1, AP2, DB1 and DB2, as a group of the virtual machines 201 having the correlation relation.

The arrangement restriction generating unit 105 generates an arrangement restriction on the basis of information on the group of the virtual machines 201 having the similarity relation, and information on the group of the virtual machines 201 having the correlation relation.

The arrangement restriction storing unit 115 stores arrangement restriction information 125 which indicates the arrangement restriction generated by the arrangement restriction generating unit 105.

Figure 9:
FIG. 9 is a diagram showing an example of arrangement restriction information 125 (before contention resolution), according to the first exemplary embodiment of the present invention.
Figure 10:
FIG. 10 is a diagram showing an example of the arrangement restriction information 125 (after contention resolution), according to the first exemplary embodiment of the present invention.

FIG. 9 and FIG. 10 are diagrams showing an example of the arrangement restriction information 125, according to the first exemplary embodiment of the present invention. According to the examples shown in FIG. 9 and FIG. 10, a distributed-arrangement restriction (first arrangement restriction) indicating a group of the virtual machines 201 to be arranged on the different processing apparatuses 200, and a collective-arrangement restriction (second arrangement restriction) indicating a group of the virtual machines 201 to be arranged on the same processing apparatus 200 are set as the arrangement restriction.

In the exemplary embodiment of the present invention, in the case that virtual machines 201 compose a load distribution configuration like the virtual machines 201 having identifiers WEB 1, WEB2 in the system shown in FIG. 3, it is assumed that the virtual machines 201 are likely to form the group of the virtual machines 201 having the similarity relation mentioned above.

In the exemplary embodiment of the present invention, the group of the virtual machines 201 having the similarity relation is used as a group of the virtual machines 201 to be arranged on the different processing apparatuses 200 (distributed-arrangement restriction). For example, in the case that a group including the virtual machines 201 having identifiers WEB 1, WEB2 is generated in the system shown in FIG. 3 as the group of the virtual machines 201 having the similarity relation, the group is set in the distributed-arrangement restriction.

Moreover, in the case that a plurality of virtual machines 201 compose the same transaction processing system like the virtual machines 201 having identifiers WEB 1, WEB2, AP1, AP2, DB1 and DB2 in the system shown in FIG. 3, it is assumed that the virtual machines 201 are likely to compose the group of the virtual machines 201 having the correlation relation mentioned above.

In the exemplary embodiment of the present invention, the group of the virtual machines 201 having the correlation relation is used as a group of the virtual machines 201 to be arranged on the same processing apparatus 200 (collective-arrangement restriction). For example, in the case that a group including the virtual machines 201 having identifiers WEB1, WEB2, AP1, AP2, DB1 and DB2 is generated in the system shown in FIG. 3 as the group of the virtual machines 201 having the correlation relation, the group is set in the collective-arrangement restriction.

Furthermore, in the case that it is impossible to arrange the virtual machines 201 so as to satisfy both the distributed-arrangement restriction and the collective-arrangement restriction, that is, in the case that a contention between the distributed-arrangement restriction and the collective-arrangement restriction is caused, the arrangement restriction generating unit 105 generates an arrangement restriction for which the contention is resolved by giving a priority to one of two arrangement restrictions.

In the case of giving a priority to the distributed-arrangement restriction, per a group (contention group) whose virtual machines 201 cannot be arranged so as to satisfy the distributed-arrangement restriction, out of groups of virtual machines 201 included in the collective-arrangement restriction, the arrangement restriction generating unit 105 generates one or more new groups of the virtual machines 201 which can be arranged on the same processing apparatus 200 while satisfying the distributed-arrangement restriction, out of the virtual machines 201 included in the group. Then, the arrangement restriction generating unit 105 defines each generated group as the collective-arrangement restriction. In the case that the new group cannot be generated while satisfying the distributed-arrangement restriction, the arrangement restriction generating unit 105 deletes the contention group.

Here, the arrangement restriction generating unit 105 may generate the group so that the number of the virtual machines 201 which is included in each group generated newly is as large as possible.

For example, in the case that the distributed-arrangement restriction includes a group of the virtual machines 201 having identifiers WEB1, WEB2, a group of the virtual machines 201 having identifiers AP1, AP2 and a group of the virtual machines 201 having identifiers DB1, DB2, and the collective-arrangement restriction includes a group of the virtual machines 201 having identifiers WEB1, WEB2, AP1, AP2, DB1 and DB2, the group of the collective-arrangement restriction is the contention group. On the basis of the virtual machine 201 which is included in the contention group, the arrangement restriction generating unit 105 generates a group of the virtual machines 201 having identifiers WEB1, AP1 and DB1, and a group of the virtual machines 201 having identifiers WEB2, AP2 and DB2, so as to satisfy the distributed-arrangement restriction, and defines each group as the new collective-arrangement restriction.

On the other hand, in the case of giving a priority to the collective-arrangement restriction, per a group (contention group) whose virtual machines 201 cannot be arranged so as to satisfy the collective-arrangement restriction, out of groups of virtual machines 201 included in the distributed-arrangement restriction, the arrangement restriction generating unit 105 generates one or more groups of the virtual machines 201 which can be arranged on the different processing apparatuses 200 while satisfying the collective-arrangement restriction, out of the virtual machines 201 included in the group. Then, the arrangement restriction generating unit 105 defines each generated group as the collective-arrangement restriction. In the case that the new group cannot be generated while satisfying the collective-arrangement restriction, the arrangement restriction generating unit 105 deletes the contention group.

Here, the arrangement restriction generating unit 105 may generate the group so that the number of the virtual machines 201 which is included in each group generated newly is as large as possible.

For example, in the case that the distributed-arrangement restriction includes the group of the virtual machines 201 having identifiers WEB 1, WEB2, the group of the virtual machines 201 having identifiers AP1, AP2 and the group of the virtual machines 201 having identifiers DB1, DB2, and the collective-arrangement restriction includes the group of the virtual machines 201 having identifiers WEB 1, WEB2, AP1, AP2, DB1 and DB2, each group of the distributed-arrangement restriction is the contention group. In this case, the arrangement restriction generating unit 105 cannot generate a group of the virtual machines 201 each of which can be arranged on the same processing means while satisfying the collective-arrangement restriction, on the basis of the virtual machine 201 which is included in each contention group. Accordingly, the arrangement restriction generating unit 105 deletes the distributed-arrangement restriction.

The administrator interaction unit 106 provides an administrator or the like with the arrangement restriction information 125 generated by the arrangement restriction generating unit 105, and receives an instruction to change arrangement of the virtual machines 201 from the administrator or the like.

In response to the instruction from the administrator interaction unit 106, the arrangement control unit 107 arranges the virtual machines 201 on the processing apparatuses 200 or changes arrangement of the virtual machines 201 on the processing apparatuses 200, according to the arrangement restriction information 125.

Note that, the virtual machine managing apparatus 100 may be a computer which includes CPU and a storage medium storing a program, and operates by control based on the program. Moreover, the performance information storing unit 111, the correlation model storing unit 113 and the arrangement restriction storing unit 115 may be included in one storage medium or in respective storage media.

Next, an operation of the virtual machine managing apparatus 100 according to the first exemplary embodiment of the present invention will be described.

Figure 4:
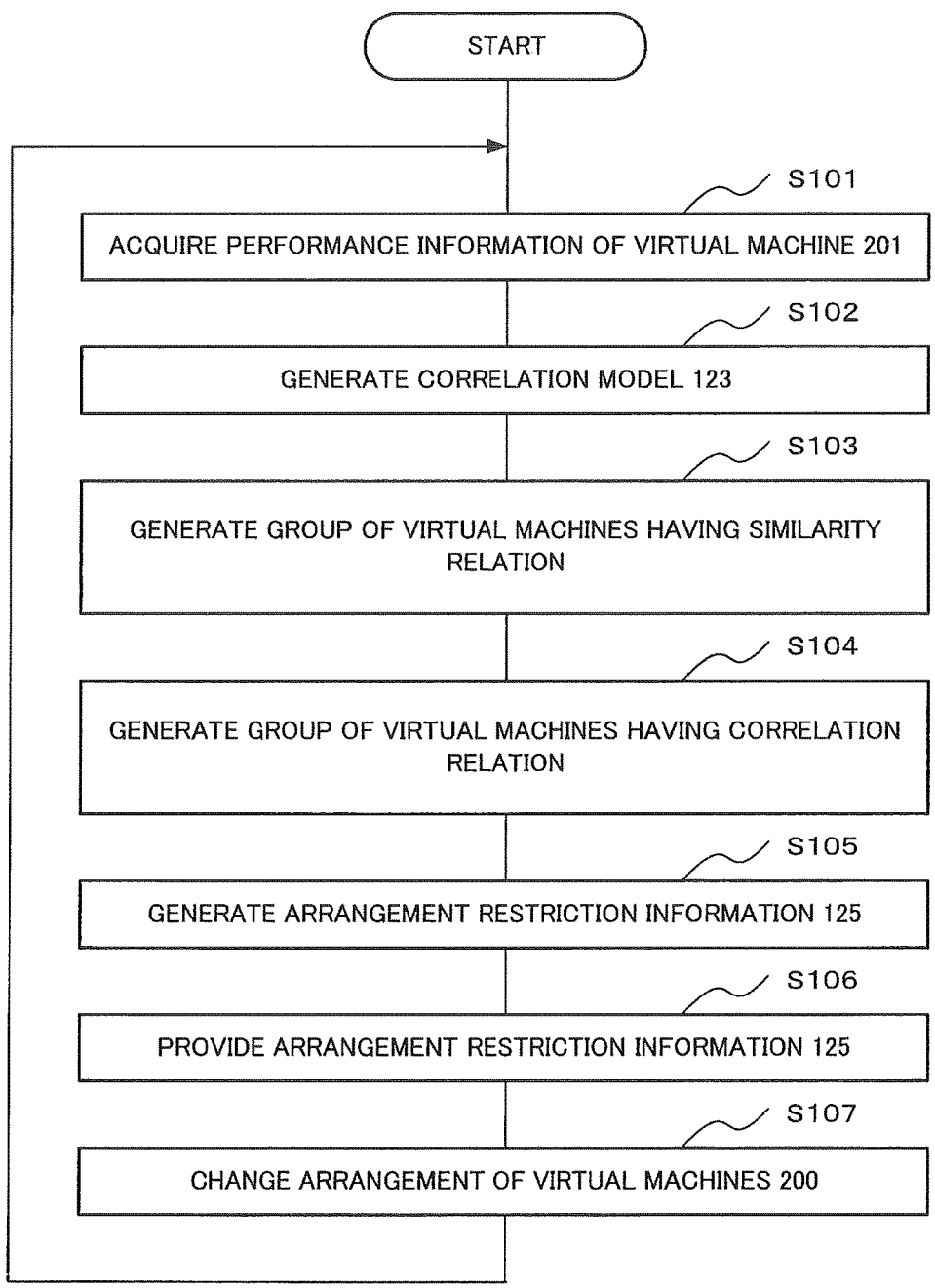
FIG. 4 is a flowchart showing a process carried out by a virtual machine managing apparatus 100, according to the first exemplary embodiment of the present invention

FIG. 4 is a flowchart showing a process carried out by the virtual machine managing apparatus 100, according to the first exemplary embodiment of the present invention.

Here, a case that virtual machines 201 which have been arranged on the processing apparatuses 200 having identifiers SV1 and SV2 are the target to be rearranged and the virtual machines 201 are rearranged on the processing apparatuses 200 is exemplified to describe an operation of the virtual machine managing apparatus 100. Moreover, it is assumed that the virtual machines 201 which compose the systems of the transaction A and the transaction B work on the processing apparatuses 200 as shown in FIG. 3.

First, the performance information collecting unit 101 of the virtual machine managing apparatus 100 acquires performance information of each virtual machine 201 which has been arranged on each processing apparatus 200 and which is the target to be rearranged, and stores the acquired performance information in the performance information storing unit 111 as the performance sequence information 121 (Step S101).

For example, the performance information collecting unit 101 acquires the performance sequence information 121 shown in FIG. 5 from the virtual machines 201 having identifiers WEB1, WEB2, WEB3, WEB4, AP1, AP2, AP3, DB1, DB2 and DB3, which are the target to be rearranged, and which have been arranged on the processing apparatuses 200 having the identifiers of SV1 and SV2, and stores the acquired performance sequence information 121 in the performance information storing unit 111.

The correlation model generating unit 103 generates a correlation model 123 of the virtual machines 201 which are the target to be rearranged, on the basis of the performance sequence information 121 which is stored in the performance information storing unit 111 and which is observed during a predetermined period of time, and stores the generated correlation model 123 in the correlation model storing unit 113 (Step S102).

For example, the correlation model generating unit 103 generates the correlation model 123 of the virtual machines 201 which are the target to be rearranged as shown in FIG. 7, and stores the generated correlation model 123 in the correlation model storing unit 113.

Next, the similar group generating unit 102 generates a group of the virtual machines 201 having a similarity relation out of the plural virtual machines 201 which are the target to be rearranged, on the basis of the performance sequence information 121 which is observed during a predetermined period (Step S103).

Figure 8:
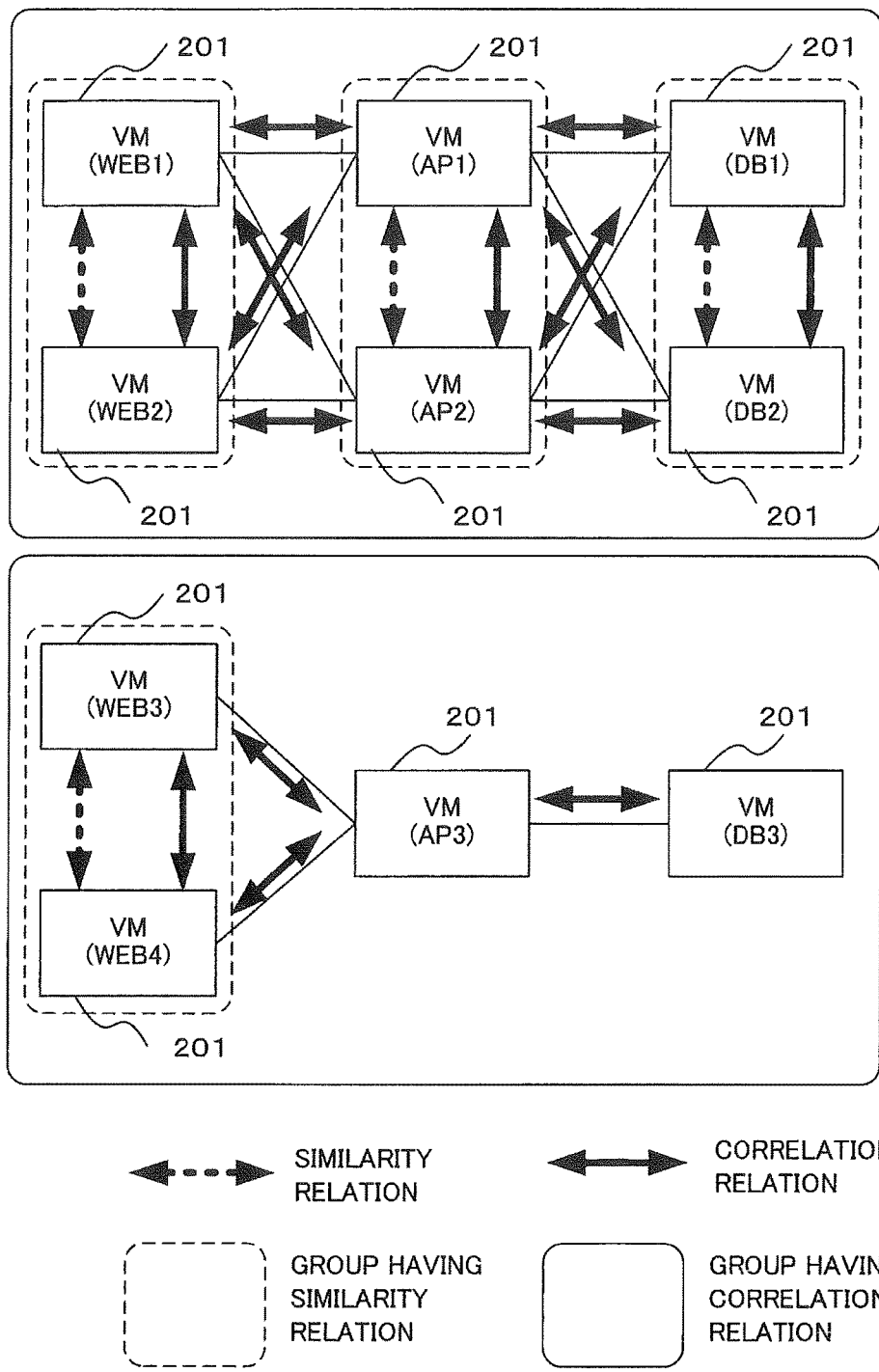
FIG. 8 is a diagram showing an example of a result of detecting a similarity relation and a correlation relation between the virtual machines 201, according to the first exemplary embodiment of the present invention.

FIG. 8 is a diagram showing an example of a result of detecting a similarity relation and a correlation relation between the virtual machines 201, according to the first exemplary embodiment of the present invention.

For example, the similar group generating unit 102 detects the similarity relation between the performance values, as shown in FIG. 6, on the basis of the performance sequence information 121 shown in FIG. 5. Here, in the case that it is judged that the similarity relation exists in a pair of the virtual machines 201 when the number of items which have the similarity relation is equal to or greater than 2, the similar group generating unit 102 extracts the similarity relations for pairs of the virtual machines 201 as shown in FIG. 8. Then, the similar group generating unit 102 defines groups of the virtual machines 201 having identifiers WEB1 and WEB2, AP1 and AP2, DB1 and DB2, and WEB3 and WEB4, respectively, as the group of the virtual machines 201 having the similarity relation, as shown in FIG. 8.

Next, the correlation group generating unit 104 generates a group of the virtual machines 201 having a correlation relation out of the plural virtual machines 201 which are the target to be rearranged, on the basis of the correlation model 123 of the correlation model storing unit 113 (Step S104).

For example, in the case that it is judged that the correlation relation exists between the virtual machines 201 when the number of the correlation relations between the performance values is equal to or greater than 1, the correlation group generating unit 104 extracts the correlation relations for pairs of the virtual machines 201 as shown in FIG. 8. Then, the similar group generating unit 102 defines a group of the virtual machines 201 having identifiers WEB1, WEB2, AP1, AP2 DB1 and DB2, and a group of the virtual machines 201 having identifiers WEB3, WEB4, AP3 and DB3 as the group of the virtual machines 201 having the correlation relation, as shown in FIG. 8.

Next, the arrangement restriction generating unit 105 generates arrangement restriction information 125 on the basis of information on the groups of the virtual machines 201 having the similarity relation which is generated in Step S103, and information on the groups of the virtual machines 201 having the correlation relation which is generated in Step S104, and stores the generated arrangement restriction information 125 in the arrangement restriction storing unit 115 (Step S105).

For example, in the case that the groups of the virtual machine 201 having the similarity relation and the groups of the virtual machines 201 having the correlation relation are generated as shown in FIG. 8, the arrangement restriction generating unit 105 sets the groups of the virtual machines 201 having the similarity relation in the distributed-arrangement restriction, and sets the groups of the virtual machines 201 having the correlation relation in the collective-arrangement restriction, in the arrangement restriction information 125, as shown in FIG. 9.

In FIG. 9, there are contentions between conditions 1, 2, 3 of the distributed-arrangement restriction and condition 5 of the collective-arrangement restriction, and between condition 4 of the distributed-arrangement restriction and condition 6 of the collective-arrangement restriction, respectively. Here, in the case of giving a priority to the distributed-arrangement restriction, the arrangement restriction generating unit 105 resolves the contention by generating groups which are indicated in conditions 5-1, 5-2, 6-1 and 6-2, on the basis of the virtual machines 201 which are included in each group indicated in the conditions 5 and 6 of the collective-arrangement restriction, as shown in FIG. 10. Note that, the group (the condition 6-2 in FIG. 10) which includes only one virtual machine 201 as a result of the contention resolution may be deleted from the arrangement restriction. The arrangement restriction generating unit 105 stores the arrangement restriction information 125 shown in FIG. 10 in the arrangement restriction storing unit 115.

Next, the administrator interaction unit 106 provides an administrator or the like with the arrangement restriction information 125 generated by the arrangement restriction generating unit 105 (Step S106).

When the arrangement control unit 107 receives an instruction to change arrangement from the administrator or the like through the administrator interaction unit 106, the arrangement control unit 107 determines arrangement of the virtual machines 201 on the processing apparatuses 200 and changes arrangement of the virtual machines 201 in such a way that the arrangement restrictions of the arrangement restriction information 125 are satisfied (Step S107).

Figure 11:
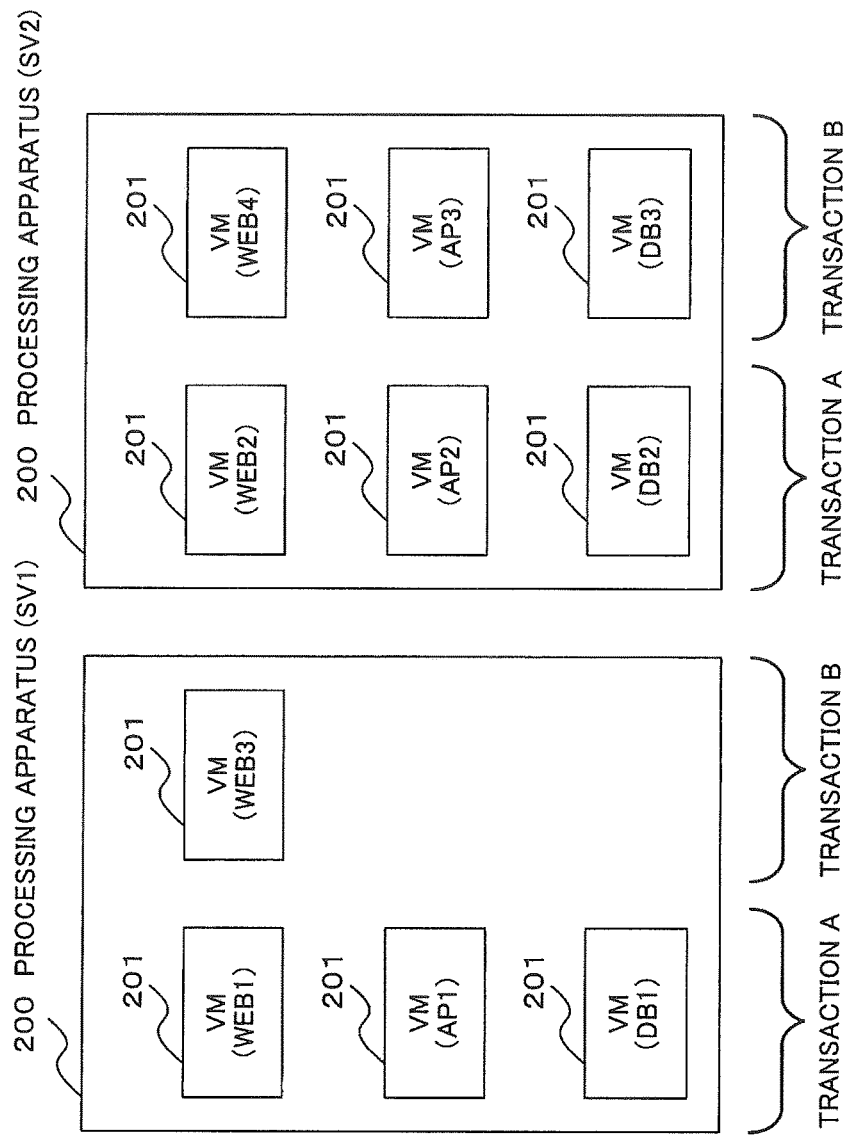
FIG. 11 is a diagram showing an example of a result of arranging the virtual machines 201, according to the first exemplary embodiment of the present invention.

FIG. 11 is a diagram showing an example of a result of arranging the virtual machines 201, according to the first exemplary embodiment of the present invention.

For example, the arrangement control unit 107 determines the processing apparatuses 200 on which the virtual machines 201 are arranged, on the basis of the arrangement restriction information 125 shown in FIG. 10. As a result, for example, the virtual machines 201 having identifiers WEB 1, AP1, DB1 and WEB3 are arranged on the processing apparatus 200 having identifier SV1. Moreover, the virtual machines 201 having identifiers WEB2, AP2, DB2, WEB4, AP3 and DB3 are arranged on the processing apparatus 200 having identifier SV2.

As mentioned above, in the system of the transaction A, the virtual machines 201 which form the load distribution configuration in each of WEB, AP and DB layers are distributed and arranged on the processing apparatuses 200 having identifiers SV1, SV2. Similarly, in the system of the transaction B, the virtual machines 201 which form the load distribution configuration in the WEB layer are also distributed and arranged on the processing apparatuses 200 having identifiers SV1, SV2. Moreover, each layer of the transaction B is collected and arranged on the processing apparatus 200 having identifier SV1, and each layer of the systems of the transaction A and the transaction B is collected and arranged on the processing apparatus 200 having identifier SV2.

Here, even if, for example, the processing apparatus 200 having identifier SV1 is caused a fault, the transaction A and the transaction B are continued since the processing apparatus 200 having identifier SV2 includes the three-tier system which can provide the transaction A and the transaction B. Similarly, in the case that the processing apparatus 200 having identifier SV2 is caused a fault, the transaction B cannot be continued but the transaction A can be continued. As mentioned above, an arrangement of the virtual machine 201, which has the fault tolerance against the fault of the processing apparatus 200, is performed.

Moreover, servers working on the virtual machines 201 which compose the same transaction processing system communicate each other. By arranging the virtual machines 201 which compose the same transaction on the same processing apparatus 200, collectively, it is possible to reduce an amount of communication traffic between the processing apparatuses 200. Moreover, in the case that each server carries out a process for a service with a time-division method like the Web server and the AP server of the same transaction processing system, the servers can use the same CPU and memory of the same processing apparatus 200 with the time-division method. As mentioned above, the virtual machine 201 is arranged in such a way that resources of the virtual machine system 1 such as a network between the processing apparatuses 200, or CPU, a memory, or the like of the processing apparatus 200 may be used efficiently.

Afterward, the processing apparatuses 200 carry out processes of the arranged virtual machines 201.

Then, it is carried out repeatedly that the virtual machine managing apparatus 100 generates the arrangement restrictions and rearranges the virtual machines 201 (Steps S101 to S107).

With that, the operation according to the first exemplary embodiment of the present invention is completed.

Figure 1:
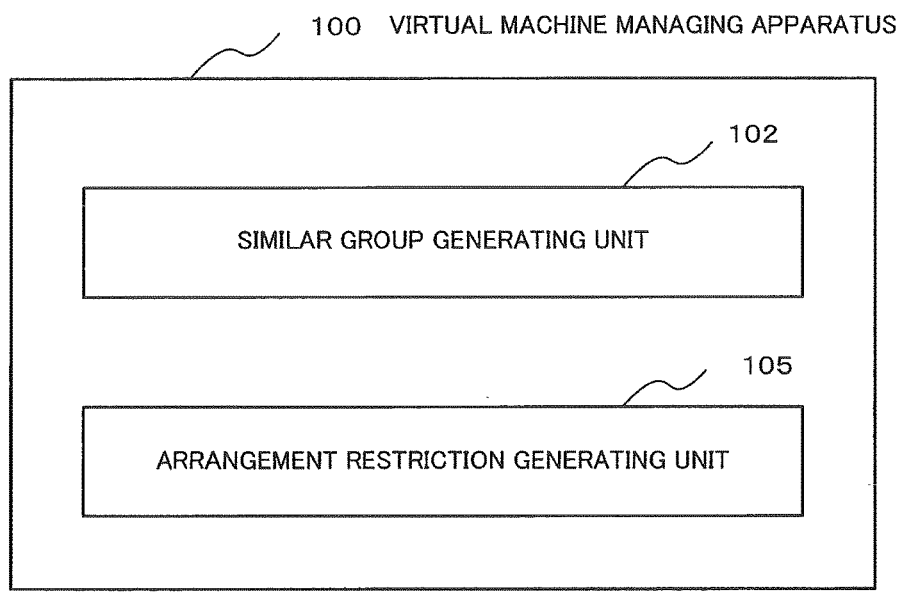
FIG. 1 is a block diagram showing a characteristic configuration, according to a first exemplary embodiment of the present invention.

Next, a characteristic configuration of the first exemplary embodiment of the present invention will be described. FIG. 1 is a block diagram showing a characteristic configuration according to the first exemplary embodiment of the present invention.

Referring to FIG. 1, a virtual machine managing apparatus 100 includes a similar group generating unit 102 and an arrangement restriction generating unit 105. The similar group generating unit 102 generates a group of virtual machines 201 having a similarity relationship which indicates that performance values of virtual machines at each timing are approximately the same, out of plural virtual machines.

The arrangement restriction generating unit 105 outputs the group of virtual machines 201 having the similarity relationship as a distributed-arrangement restriction indicating a group of virtual machines 201 to be arranged on different processing apparatuses 200 among plural processing apparatuses 200 carrying out processes of the virtual machines 201.

According to the first exemplary embodiment of the present invention, it is possible to perform an arrangement of virtual machines 201, which has fault tolerance against the fault of the processing apparatus 200, in the virtual machine system. The reason is that the similar group generating unit 102 generates a group of virtual machines 201 having a similarity relation which indicates that performance values at each timing is approximately the same, out of plural virtual machines 201, and the arrangement restriction generating unit 105 outputs the group of virtual machines 201 having the similarity relation as a distributed-arrangement restriction indicating a group of virtual machines 201 to be arranged on the different processing apparatuses among the plural processing apparatuses 200 carrying out processes of virtual machines 201.

According to the first exemplary embodiment of the present invention, it is possible to arrange virtual machines 201 in such a way that resources of the virtual machine system 1 are used efficiently. The reason is that the correlation group generating unit 104 generates a group of virtual machines 201 having a correlation relation out of the plural virtual machines 201, and the arrangement restriction generating unit 105 outputs the group of virtual machines 201 having the correlation relation as a collective-arrangement restriction indicating a group of virtual machines 201 to be arranged on the same processing apparatus 200 among the plural processing apparatus 200.

Moreover, according to the first exemplary embodiment of the present invention, even if an administrator or the like of the virtual machine system 1 does not know the contents of the process which is carried out by each virtual machine 201, it is possible to perform the arrangement of virtual machines 201, which has fault tolerance and uses resources efficiently. The reason is that, on the basis of the time-domain sequences of the performance values of plural virtual machines 201, the similar group generating unit 102 generates a group of virtual machines having the similarity relation, and the correlation group generating unit 104 generates a group of virtual machines 201 having the correlation relation, respectively.

(Second Embodiment)

Next, a second exemplary embodiment of the present invention will be described. According to the second exemplary embodiment of the present invention, the arrangement restriction is generated with giving a priority to an arrangement restriction (an external restriction) which is inputted by an administrator or the like.

Figure 12:
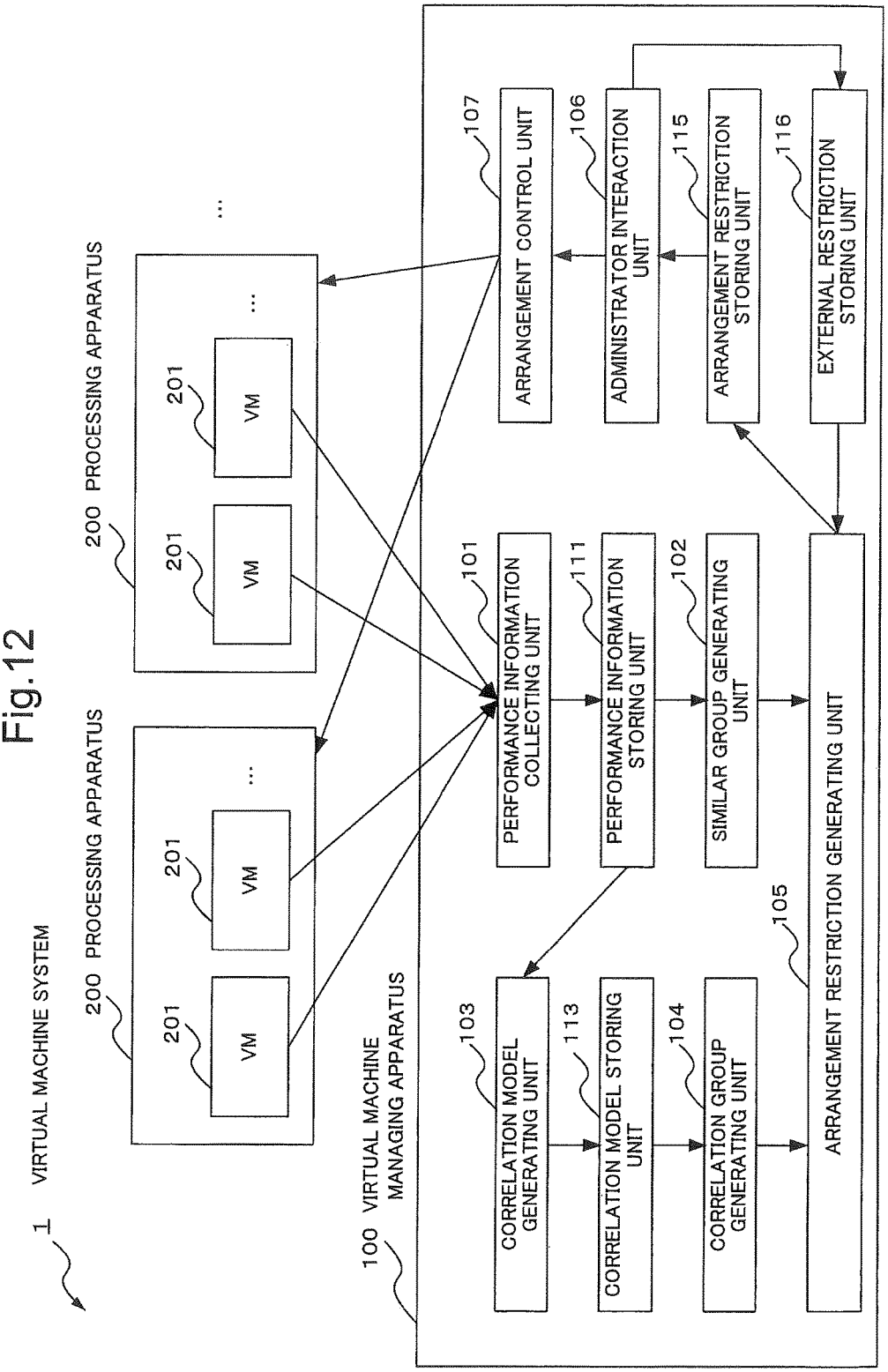
FIG. 12 is a block diagram showing a configuration of the virtual machine system 1, according to a second exemplary embodiment of the present invention.

FIG. 12 is a block diagram showing a configuration of the virtual machine system 1 according to the second exemplary embodiment of the present invention. The virtual machine managing apparatus 100 according to the second exemplary embodiment of the present invention includes an external restriction storing unit 116 in addition to the configuration of the virtual machine managing apparatus 100 according to the first exemplary embodiment of the present invention.

The external restriction storing unit 116 stores external restriction information 126 which indicates an external restriction which is inputted by the administrator or the like. The external restriction of the external restriction information 126 is inputted by the administrator or the like through the administrator interaction unit 106. Similarly to the arrangement restriction information 125 shown in FIG. 10, at least one of a distributed-arrangement restriction (an external distributed-arrangement restriction, or first external restriction) and a collective-arrangement restriction (an external collective-arrangement restriction or second external restriction) is set as the external restriction.

The arrangement restriction generating unit 105 generates a new arrangement restriction by adding the external restriction of the external restriction information 126 to the arrangement restriction generated in Step S105, and outputs the new arrangement restriction.

Moreover, in the case that it is impossible to arrange the virtual machines 201 so as to satisfy both the arrangement restriction generated in Step S105 and the external restriction, that is, in the case that a contention between the arrangement restriction generated in Step S105 and the external arrangement restriction is caused, the arrangement restriction generating unit 105 generates an arrangement restriction which resolves the contention by giving a priority to the external restriction.

The arrangement restriction generating unit 105 resolves the contention between the arrangement restriction generated in Step S105 and the external restriction by use of a method which is the same as the method of resolving the contention between the distributed-arrangement restriction and the collective-arrangement restriction.

That is, per a group (contention group) whose virtual machine 201 cannot be arranged so as to satisfy the external distributed-arrangement restriction out of groups of virtual machines 201 included in the collective-arrangement restriction generated in Step S105, the arrangement restriction generating unit 105 generates one or more new groups of virtual machines 201 which can be arranged on the same processing apparatus 200 while satisfying the external distributed-arrangement restriction, out of the virtual machines 201 included in the group (contention group). Then, the arrangement restriction generating unit 105 generates a new collective-arrangement restriction by adding the external collective-arrangement restriction to the generated group.

Moreover, per a group (contention group) whose virtual machine 201 cannot be arranged so as to satisfy the external collective-arrangement restriction out of groups of virtual machines 201 included in the distributed-arrangement restriction generated in Step S105, the arrangement restriction generating unit 105 generates one or more new groups of virtual machines 201 which can be arranged on the different processing apparatuses 200 while satisfying the external collective-arrangement restriction, out of the virtual machines 201 included in the group (contention group). Then, the arrangement restriction generating unit 105 generates a new distributed-arrangement restriction by adding the external distributed-arrangement restriction to the generated group.

As a result, it is possible to arrange virtual machine 201 with satisfying a specific arrangement restriction which is inputted by the administrator or the like.

For example, in the case that virtual machines 201 need to be collected temporarily in a specific processing apparatus 200 due to a regular maintenance of the processing apparatus 200 or a change in the configuration including virtual machines 201, it is possible to collect a specific virtual machine 201 by the external collective-arrangement restriction.

According to the second exemplary embodiment of the present invention, it is possible to perform arrangement of virtual machines 201, which has fault tolerance and uses resources efficiently with satisfying a specific arrangement restriction inputted by an administrator or the like of the virtual machine system 1. The reason is that the arrangement restriction generating unit 105 generates an arrangement restriction with giving a priority to an arrangement restriction (an external restriction) inputted by the administrator or the like.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2011-094119, filed on Apr. 20, 2011, the disclosure of which is incorporated herein in its entirety by reference.

REFERENCE SIGNS LIST 1 virtual machine system
100 virtual machine managing apparatus
101 performance information collecting unit
102 similar group generating unit
103 correlation model generating unit
104 correlation group generating unit
105 arrangement restriction generating unit
106 administrator interaction unit
107 arrangement control unit
111 performance information storing unit
113 correlation model storing unit
115 arrangement restriction storing unit
116 external restriction storing unit
121 performance sequence information
123 correlation model
125 arrangement restriction information
126 external restriction storing unit
200 processing apparatus
201 virtual machine

What is claimed is:

1. A virtual machine managing apparatus, comprising:
a memory storing instructions; and
one or more processors configured to execute instructions to:
  acquire performance values of plural virtual machines;
  allocate virtual machines whose sequential changes of the performance values in a time-domain are equal to each other or within a threshold value, out of the plural virtual machines, on different processing apparatuses among plural processing apparatuses carrying out processes of virtual machines; and
  allocate virtual machines having a correlation relation between performance values, out of the plural virtual machines, on a same processing apparatus among the plural processing apparatuses, said correlation relation being indicated by a transform function for estimating one performance value from another performance value,
wherein said correlation relation is detected based on weight of the transform function.

2. The virtual machine managing apparatus according to claim 1, wherein each of the plural virtual machines carries out a process of any one of a plurality of services.

3. The virtual machine managing apparatus according to claim 1, wherein virtual machines whose performance values at each timing are equal to each other or within a threshold value, out of the plural virtual machines, are allocated on different processing apparatuses among the plural processing apparatuses.

4. The virtual machine managing apparatus according to claim 1, wherein virtual machines, in which a mean value or an integral value of an absolute value of a difference between the performance values observed during a predetermined period of time is equal to or smaller than a predetermined value, out of the plural virtual machines, are allocated on different processing apparatuses among the plural processing apparatuses.

5. The virtual machine managing apparatus according to claim 1, wherein, in a case that the plural virtual machines cannot be placed onto the plural processing apparatuses, such that to satisfy both of allocating virtual machines whose sequential changes of the performance values in a time-domain are equal to each other or within a threshold value on different processing apparatuses and allocating virtual machines which have a correlation relation between performance values on a same processing apparatus, priority is given to the allocating the virtual machines whose sequential changes of the performance values in the time-domain are equal to each other or within the threshold value on different processing apparatuses.

6. The virtual machine managing apparatus according to claim 1, wherein, in a case that said plural virtual machines cannot be placed onto said plural processing apparatuses, such that to satisfy both of allocating virtual machines whose sequential changes of the performance values in a time-domain are equal to each other or within a threshold value on different processing apparatuses and allocating virtual machines which have a correlation relation between performance values on a same processing apparatus, priority is given to the allocating the virtual machines which have the correlation relation between the performance values on the same processing apparatus.

7. The virtual machine managing apparatus according to claim 1, the one or more processors being configured to further execute the instructions to store external restriction information including at least one of a first external restriction which is inputted as a group of virtual machines to be arranged on different processing apparatuses, and a second external restriction which is inputted as a group of virtual machines to be arranged on the same processing apparatus,
wherein, in a case that external restriction information includes the first external restriction, virtual machines having a correlation relation between performance values are allocated on the same processing apparatus among the plural processing apparatuses while satisfying the first external restriction, and
wherein, in a case that the external restriction information includes the second external restriction, virtual machines whose sequential changes of the performance values in a time-domain are equal to each other or within a threshold value are allocated on different processing apparatuses among the plural processing apparatuses while satisfying the second external restriction.

8. The virtual machine managing apparatus according to claim 1, the one or more processors further being configured to execute the instructions to determine virtual machines to be allocated on each of the plural processing apparatuses, on a basis of the virtual machines to be allocated on different processing apparatuses and the virtual machines to be allocated on the same processing apparatus.

9. The virtual machine managing apparatus according to claim 1, wherein the transform function is calculated based on a transformation error of the transform function.

10. A virtual machine managing method, comprising:
acquiring performance values of plural virtual machines;
allocating virtual machines whose sequential changes of the performance values in a time-domain are equal to each other or within a threshold value, out of the plural virtual machines, on different processing apparatuses among plural processing apparatuses carrying out processes of virtual machines; and
allocating virtual machines having a correlation relation between performance values, out of the plural virtual machines, on a same processing apparatus among the plural processing apparatuses, said correlation relation being indicated by a transform function for estimating one performance value from another performance value,
wherein said correlation relation is detected based on a weight of the transform function.

11. The virtual machine managing method according to claim 10, wherein each of the plural virtual machines carries out a process of any one of a plurality of services.

12. The virtual machine managing method according to claim 10, wherein virtual machines whose performance values at each timing are equal to each other or within a threshold value, out of the plural virtual machines, are allocated on different processing apparatuses among the plural processing apparatuses.

13. The virtual machine managing method according to claim 10, wherein virtual machines, in which a mean value or an integral value of an absolute value of difference between the performance values observed during a predetermined period of time is equal to or smaller than a predetermined value, out of the plural virtual machines, are allocated on different processing apparatuses among the plural processing apparatuses.

14. A non-transitory computer readable storage medium recording thereon a program, causing a computer to perform a method comprising:
acquiring performance values of plural virtual machines;
allocating virtual machines whose sequential changes of the performance values in a time-domain are equal to each other or within a threshold value, out of the plural virtual machines, on different processing apparatuses among plural processing apparatuses carrying out processes of virtual machines; and
allocating virtual machines having a correlation relation between performance values, out of the plural virtual machines, on a same processing apparatus among the plural processing apparatuses, said correlation relation being indicated by a transform function for estimating one performance value from another performance value,
wherein said correlation relation is detected based on a weight of the transform function.

15. The non-transitory computer readable storage medium according to claim 14, recording thereon the program, causing the computer to perform the method,
wherein each of the plural virtual machines carries out a process of any one of a plurality of services.

16. The non-transitory computer readable storage medium according to claim 14, wherein virtual machines whose performance values at each timing are equal to each other or within a threshold value, out of the plural virtual machines, are allocated on different processing apparatuses among the plural processing apparatuses.

17. The non-transitory computer readable storage medium according to claim 14, wherein virtual machines, in which a mean value or an integral value of an absolute value of difference between the performance values observed during a predetermined period of time is equal to or smaller than a predetermined value, out of the plural virtual machines, are allocated on different processing apparatuses among the plural processing apparatuses.

* * * * *